Figure 1:
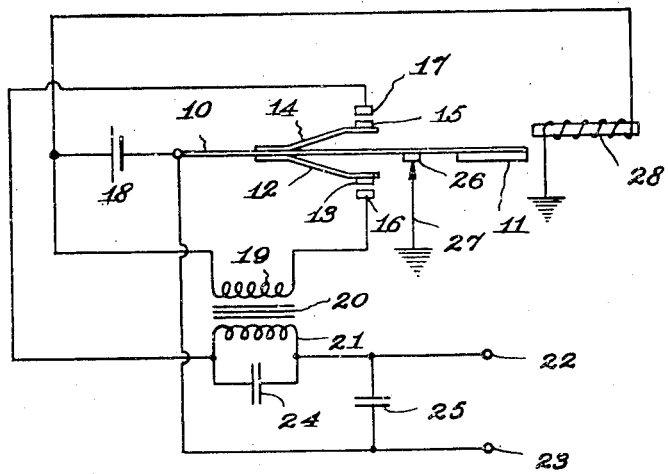

Nov. 9, 1948.　　　R. J. AUST　　　2,453,612

VIBRATOR POWER SUPPLY

Filed April 14, 1944

INVENTOR
ROBERT J. AUST
by Chester F. Carlson
his ATTORNEY

Patented Nov. 9, 1948

2,453,612

UNITED STATES PATENT OFFICE 2,453,612

VIBRATOR POWER SUPPLY

Robert J. Aust, Indianapolis, Ind., assignor to P. R. Mallory & Co., Inc., Indianapolis, Ind., a corporation of Delaware Application April 14, 1944, Serial No. 531,091

2 Claims. (Cl. 171—97)

The present invention relates to vibrator power supply systems, and, more particularly, to a power supply system including an electromagnetic vibratory interrupter of novel and improved character for supplying plate voltage to vacuum tube hearing aids, portable radio receivers, and similar electronic devices of a portable type having very small dimensions.

At the present time vacuum tube hearing aids, portable radio receivers of very small dimensions, the so-called "personal" radios, are designed for operation with miniature tubes and "A" and "B" dry batteries. In general, the "A" batteries are standard flashlight cells of which one or two are used, while the "B" batteries are special dry batteries constituted of a large number of very small cells connected in series to provide voltages of the order of 45 or 67½ volts. Although the miniature tubes employed in these electronic devices have relatively low current consumption, space considerations necessitate the use of "B" batteries of very small size having a very short life, due to the fact that the capacity of dry cells decreases at a much higher rate than their dimensions. Also, such high-voltage dry batteries of small dimensions are relatively expensive, and unduly increase the cost of operating small-sized portable electronic devices. Moreover, in contrast to conventional flashlight batteries, special dry batteries of high voltage are not readily obtainable except in large cities since dealers in smaller communities hesitate to keep them in stock in view of their high cost, short "shelf life" and in view of the restricted demand for such batteries. This situation has greatly interfered with the practical applications of vacuum tube hearing aids, "personal" radios, and the like, although the public interest in these devices continued to be quite keen since their first introduction.

It was already suggested to dispense with high-voltage "B" batteries in devices of the described character and to utilize the low-voltage "A" battery as the source of plate voltage as well, such voltage being stepped up and rectified by means of the well-known combination of a synchronous electromagnetic vibratory interrupter and a step-up transformer. Considerable difficulties have been experienced, however, in carrying this concept into practice due to the greatly restricted space available for the power pack in these devices and also due to the relatively moderate energies available for the conversion. Although a substantial demand existed for such miniature power packs for several years and various suggestions and proposals were made to solve the outstanding problem, as far as is known, none of these suggestions and proposals was completely satisfactory and successful when carried into practice on a practical and commercial scale.

It is an object of the present invention to provide a vibrator power supply system which eliminates the foregoing difficulties connected with the construction and operation of vibratory interrupters of very small dimensions and which constitutes a complete solution of the outstanding problem.

It is another object of the present invention to provide a vibrator power supply system including a vibratory interrupter of special and greatly simplified construction which combines very small dimensions with great operational efficiency.

It is a further object of the invention to provide a novel structural and circuit organization for a vibrator power supply system which may be built into an extremely small space and which is capable of converting direct current drawn from a low-voltage source into direct current of considerably higher voltage to supply plate current to small electron tubes with great efficiency.

It is also within the contemplation of the invention to provide a vibrator power supply system including a self-rectifying vibrator of novel character and a step-up transformer organized into a structural unit of very small dimensions, which is free from noise, objectionable vibrations, and other operating difficulties.

The invention also contemplates a vibrator power supply system of novel and improved character which is extremely simple in construction, efficient and foolproof in operation, and which may be readily manufactured in very small dimensions and sold on a practical and commercial scale in competition with high-voltage dry batteries.

Figure 2:
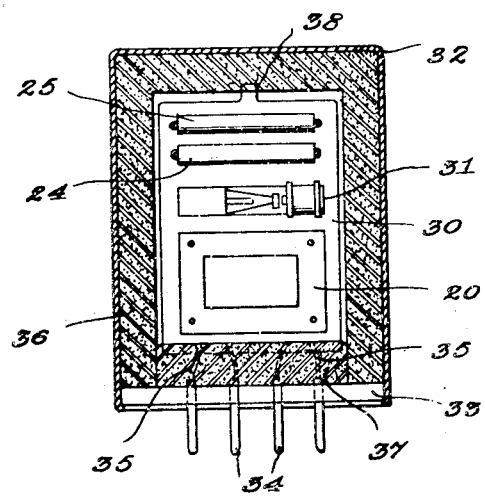

Other and further objects and advantages of the invention will become apparent from the following description, taken in conjunction with the accompanying drawing; in which Fig. 1 illustrates a circuit diagram of a vibrator power supply system embodying the principles of the present invention; and Fig. 2 depicts a vertical sectional view, somewhat fragmentary in character, of a preferred embodiment of the invention, approximately in original size.

While a preferred embodiment of the invention is described herein, it is contemplated that considerable variation may be made in the method of procedure and the construction of parts without departing from the spirit of the invention. In the following description, and in the claims, parts will be identified by specific names, for convenience, but they are intended to be as generic in their application to similar parts as the art will permit.

Referring now more particularly to Fig. 1 of the drawing, reference character 10 denotes a vibratory reed clamped at one end and carrying an armature or weight 11 at its other end. A side arm is secured to each side of reed 10 of which side arm 12 carries a vibratory contact 13 and side arm 14 carries a vibratory contact 15 at the end thereof. Vibratory contact 13 cooperates with fixed interrupter contact 16 and vibratory contact 15 cooperates with fixed rectifier contact 17. A source of low voltage 18 has one of its terminals connected to reed 10 and its other terminal to one end of primary winding 19 of a transformer 20, the other end of which is connected to fixed interrupter contact 16. Secondary winding 21 of the transformer has one of its ends connected to fixed rectifier contact 17 and its other end connected to output terminal 22. The other output terminal 23 is connected to reed 10. A buffer condenser 24 is connected across secondary winding 21 and a filter condenser 25 is connected between output terminals 22 and 23.

The driver circuit comprises a vibratory driver contact 26 carried on reed 10 cooperating with a relatively fixed driver contact 27, which is connected to ground. Deflecting force is applied to armature 11 by means of driver coil 28 and one end of which is connected to one terminal source of low voltage 18 and the other end of which is grounded.

From the foregoing description, the operation of the vibrator power supply system embodying the invention will be readily understood by those skilled in the art. It will be noted that in the normal position of rest driver contacts 26 and 27 are closed and complete the circuit of driver coil 28. Thus, the driver coil will be energized, deflecting reed 10 and interrupting the driver circuit between the driver contacts, etc., so that the reed will be maintained in continuous vibratory motion in a manner well understood.

During the vibratory operation of reed 10, the circuit of primary winding 19 of transformer 20 will be alternately closed and opened. This will induce an alternating voltage of much higher value in secondary winding 21 of the transformer. The circuit of this secondary winding is normally open between contacts 15 and 17 and will be closed immediately following opening of the primary circuit between contacts 13 and 16. Thus contacts 15 and 17 will function as a half-wave rectifier for the alternating voltage induced in the secondary winding. The pulsating direct current is filtered by means of condenser 25 and the filtered current of high voltage may be withdrawn at terminals 22 and 23.

In the vibrator of the invention one set of the main contacts is used as the primary interrupter, while the other set is used as the rectifier contacts, rectification occurring on the "break" of the cycle, instead of the "make" of the cycle, as this is customary in conventional vibrators. A driver contact vibrator is employed to reduce the driving energy to a minimum and to insulate the driver circuit from the interrupter circuit. This novel structural and circuit organization provides great operational advantages and makes it possible to build the vibrator in very small dimensions.

Power packs have been designed and built in accordance with the principles of the present invention having approximately the size of a pack of cigarettes and capable of supplying 1 milliampere at 60 volts direct current from a 2 volt battery with a minimum of battery drain. It was found that by using the described circuit arrangement, with a properly designed transformer, this could be accomplished with an over-all efficiency of about 40%, or drawing about 80 milliamperes at 2 volts from the battery. Preferably, the magnetizing current in the transformer is kept very low by providing a high primary inductance.

Fig. 2 illustrates the mechanical arrangement of a power pack of the described character. All of the cooperating elements of the power pack are mounted on a small metal plate 30, supporting transformer 20, the vibrator generally denoted by reference character 31, and condensers 24 and 25. Plate 30 is enclosed by a metal can 32 having a generally oblong shape and similar in its dimensions to a pack of cigarettes. The lower extremities of can 32 are sealed by means of a plate 33 of insulating material from which downwardly protrude contact prongs 34. Connection between prongs 34 and the power pack on plate 30 is established by means of flexible conductors 35. Can 32 is lined with a thick layer of vibration-absorbing material, such as sponge rubber 36, a piece of similar material 37 being inserted between insulative plate 33 and the power pack having holes therein through which flexible conductors 35 may protrude. A small protuberance 38 may extend from plate 30 into sponge rubber lining 36 to hold the mounting plate against displacement. It has been found that in this novel structural arrangement of the power pack the substantial mass of transformer 20 will effectively dampen the mechanical vibrations caused by the operation of the vibrator so that the assembly will not vibrate appreciably and will be completely free from undesirable noise and vibrations.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A vibrator power supply system comprising in combination a vibratory reed having vibratory interrupter and rectifier contacts mounted on opposite sides thereof, stationary interrupter and rectifier contacts arranged for cooperation with the corresponding vibratory contacts, a step-up transformer having a primary and a secondary winding, connections between said transformer and said contacts to alternately connect the said primary winding to a source of low-voltage current and the said secondary winding to an output load whereby said secondary winding will be loaded during the "break" cycle of the said primary winding, and electromagnetic driver means energized from said source and under the control of said reed for maintaining the reed in vibration.

2. A vibrator power supply system comprising in combination a vibratory reed having vibratory interrupter and rectifier contacts mounted on opposite sides thereof, stationary interrupter and rectifier contacts arranged for cooperation with the corresponding vibratory contacts, a step-up transformer having its primary winding connected in series with said interrupter contacts and with a source of low-voltage direct current and having its secondary winding connected in series with said rectifier contacts and with an output load whereby the secondary winding will be connected to said load during the "break" cycle of said interrupter contacts, and driving means for said reed including a driver electromagnet and a set of driver contacts under the control of said reed to maintain said reed in vibration.

ROBERT J. AUST.

REFERENCES CITED

The following references are of record in the file of this patent:

UNITED STATES PATENTS

| Number | Name | Date |
| --- | --- | --- |
| 2,003,311 | Guedon et al. | Dec. 8, 1936 |
| 2,012,123 | Dressel | Aug. 20, 1935 |
| 2,306,002 | Sullivan et al. | Dec. 22, 1942 |
| 2,308,549 | Shapiro | Jan. 19, 1943 |

FOREIGN PATENTS

| Number | Country | Date |
| --- | --- | --- |
| 36,669 | Denmark | Oct. 4, 1926 |